(12) United States Patent
Suto et al.

(10) Patent No.: US 12,431,157 B2
(45) Date of Patent: Sep. 30, 2025

(54) AUDIO PLAYBACK AND CAPTIONING

(71) Applicant: INTERNATIONAL BUSINESS MACHINES CORPORATION, Armonk, NY (US)

(72) Inventors: Tiberiu Suto, Franklin, NY (US); Shikhar Kwatra, San Jose, CA (US); Sushain Pandit, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 18/178,628

(22) Filed: Mar. 6, 2023

(65) Prior Publication Data

US 2024/0304208 A1 Sep. 12, 2024

(51) Int. Cl.
*G10L 13/033* (2013.01)
*G10L 15/18* (2013.01)
(Continued)

(52) U.S. Cl.
CPC ........ *G10L 21/057* (2013.01); *G10L 15/1815* (2013.01); *G10L 21/043* (2013.01);
(Continued)

(58) Field of Classification Search
CPC ....... G10L 13/033; G10L 13/02; G06F 40/30; G06F 40/194
See application file for complete search history.

(56) References Cited

U.S. PATENT DOCUMENTS

| 5,754,978 A | 5/1998 | Perez-Mendez et al. |
| 6,598,228 B2 | 7/2003 | Hejna, Jr. et al. |

(Continued)

FOREIGN PATENT DOCUMENTS

| CN | 109410926 A | 3/2019 |
| JP | 6103656 B2 | 3/2017 |

OTHER PUBLICATIONS

Disclosed Anonymously, "Contextual Closed Captioning Co-occurrence Assistant", IP.com, IP.com No. IPCOM000263445D, IP.com Publication Date: Aug. 31, 2020, 6 pages.
(Continued)

*Primary Examiner* — Feng-Tzer Tzeng
(74) *Attorney, Agent, or Firm* — Kristofer Haggerty (57) ABSTRACT

A method, a structure, and a computer system for playback optimization. The exemplary embodiments may include transcribing an audio stream at normal and at high playback speed, as well as determining whether portions of the audio stream are unintelligible at the high playback speed. The exemplary embodiments may further include reducing a speed of the high playback speed for portions determined unintelligible, and transcribing the audio stream with the unintelligible portions played at the reduced high playback speed. The exemplary embodiments may further include determining whether the unintelligible portions are still unintelligible at the reduced high playback speed and, if not, identifying the reduced high playback speed as an optimal playback speed of the unintelligible portions. The exemplary embodiments may additionally include, in response to receiving a request to play the audio stream at the high playback speed, playing the unintelligible portions at the optimal playback speed.

20 Claims, 3 Drawing Sheets

(51) Int. Cl.
  *G10L 21/043* (2013.01)
  *G10L 21/057* (2013.01)
  *G10L 25/60* (2013.01)
  *G06F 40/30* (2020.01)
  *G10L 13/02* (2013.01)

(52) U.S. Cl.
  CPC .............. *G10L 25/60* (2013.01); *G06F 40/30* (2020.01); *G10L 13/02* (2013.01); *G10L 13/033* (2013.01)

(56) References Cited

U.S. PATENT DOCUMENTS

| | | |
|---|---|---|
| 6,754,629 B1 | 6/2004 | Qi et al. |
| 7,506,356 B2 | 3/2009 | Gupta et al. |
| 7,739,715 B2 | 6/2010 | He et al. |
| 7,925,509 B2 | 4/2011 | Momosaki et al. |
| 8,914,290 B2 | 12/2014 | Hendrickson et al. |
| 9,020,803 B2 | 4/2015 | Carter et al. |
| 9,613,638 B2 | 4/2017 | Loukina et al. |
| 10,354,660 B2 | 7/2019 | Badr et al. |
| 11,380,315 B2 | 7/2022 | Abdulkader et al. |
| 2004/0267952 A1 | 12/2004 | He |
| 2012/0296654 A1* | 11/2012 | Hendrickson ......... G10L 13/033 704/260 |
| 2012/0303358 A1* | 11/2012 | Ducatel ................... G06F 40/30 704/9 |
| 2014/0101171 A1* | 4/2014 | Danielyan ............. G06F 40/284 707/E17.058 |
| 2021/0142789 A1 | 5/2021 | Gurbani et al. |
| 2022/0059075 A1 | 2/2022 | Thomson et al. |
| 2022/0272284 A1* | 8/2022 | Chandrashekar .. H04N 21/4884 |

OTHER PUBLICATIONS

Overcast, "Overcast—Free, simple, award-winning podcast player for iPhone, iPad, and Apple Watch," Accessed: Jan. 18, 2023, https://overcast.fm/, 4 pages.

\* cited by examiner

AUDIO PLAYBACK AND CAPTIONING

BACKGROUND

The exemplary embodiments relate generally to audio analytics, and more particularly to improved intelligibility of audio playback and captioning based on linguistic analysis.

When listening to an audio stream such as a lecture or podcast, many listeners may find a more pleasant and efficient learning experience to playback the audio faster than it was initially recorded, particularly when a presenter speaks very slowly or pauses frequently. While most streaming platforms allow a listener to increase playback speed (e.g., 1.5× or 2×), the increased playback speed may render some words or portions of the audio stream unintelligible.

SUMMARY

The exemplary embodiments disclose a method, a structure, and a computer system for optimized audio playback. The exemplary embodiments may include transcribing an audio stream at normal playback speed and at high playback speed, wherein the normal playback speed is that at which the audio stream was recorded, as well as determining whether portions of the audio stream are unintelligible at the high playback speed based on comparing the transcripts. The exemplary embodiments may further include, in response to determining that the portions of the audio stream are unintelligible at the high playback speed, reducing a speed of the high playback speed for the unintelligible portions, and transcribing the audio stream with the unintelligible portions played at the reduced high playback speed. The exemplary embodiments may further include determining whether the unintelligible portions are still unintelligible at the reduced high playback speed based on comparing the transcripts and, based on determining that the unintelligible portions are intelligible at the reduced high playback speed, identifying the reduced high playback speed as an optimal playback speed of the unintelligible portions. The exemplary embodiments may additionally include, in response to receiving a request to play the audio stream at the high playback speed, playing the unintelligible portions at the optimal playback speed.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

When listening to an audio stream such as a lecture or podcast, many listeners may find a more pleasant and efficient learning experience to playback the audio faster than it was initially recorded, particularly when a presenter speaks very slowly or pauses frequently. While most streaming platforms allow a listener to increase playback speed (e.g., 1.5× or 2×), the increased playback speed may render some words or portions of the audio stream unintelligible.

The present invention may be configured to improve intelligibility of audio streams listened to at high playback speed. The present invention may do so by first identifying words rendered unintelligible at increased playback speed and reducing their playback speed until they are intelligible, hereinafter referred to as an optimal playback speed for the unintelligible words. Subsequently, if a user requests to listen to the audio stream at high playback speed, the present invention may play the unintelligible words at the optimal playback speed such that they are intelligible while playing a remainder of the audio stream at the requested high playback speed. In doing so, the present invention renders all of the audio stream intelligible at a preferred pace of a listener, thereby improving technologies in the field of audio analysis and audio playback.

This process may be equally applicable to audio streams converted to captions or subtitles. In such embodiments, audio streams that are difficult to hear may be displayed as captions or audio streams in alternative languages may be displayed as subtitles. In either case, the present invention may be configured to determine whether a caption or subtitle is unintelligible, and corresponding text may be slowed or displayed for a greater duration to ensure intelligibility.

Embodiments of the present invention may further implement a filtering system that determines whether words identified as unintelligible are sufficiently important to the meaning of a statement prior to performing the process of improving intelligibility. Thus, the present invention may only improve intelligible of unintelligible words deemed important enough to a meaning of the statement while foregoing the process on those that are not. A more detailed discussion of the embodiments follows.

Figure 1:
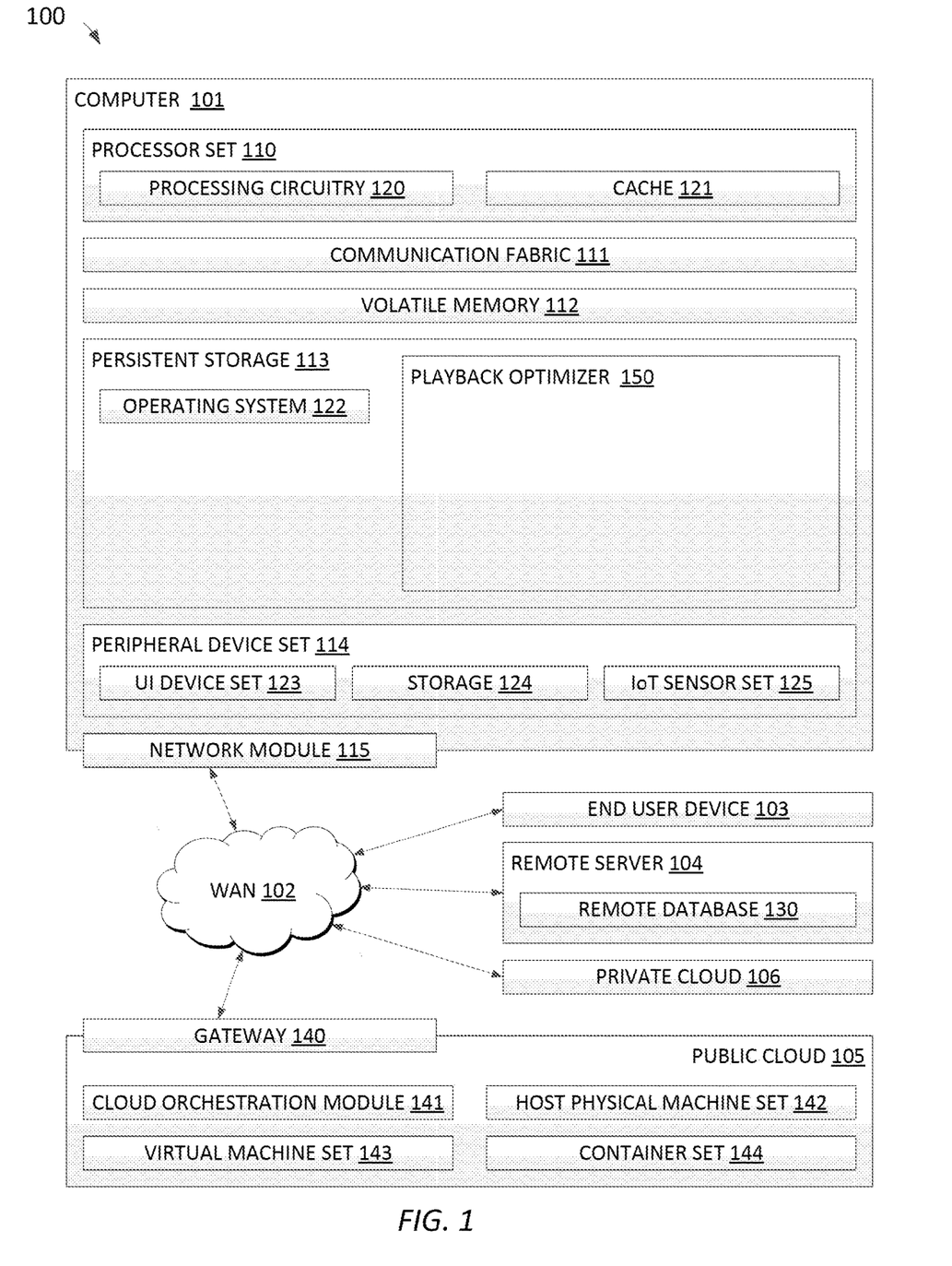
FIG. 1 depicts an exemplary block diagram depicting the components of computing environment 100, in accordance with the exemplary embodiments.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as playback optimizer 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
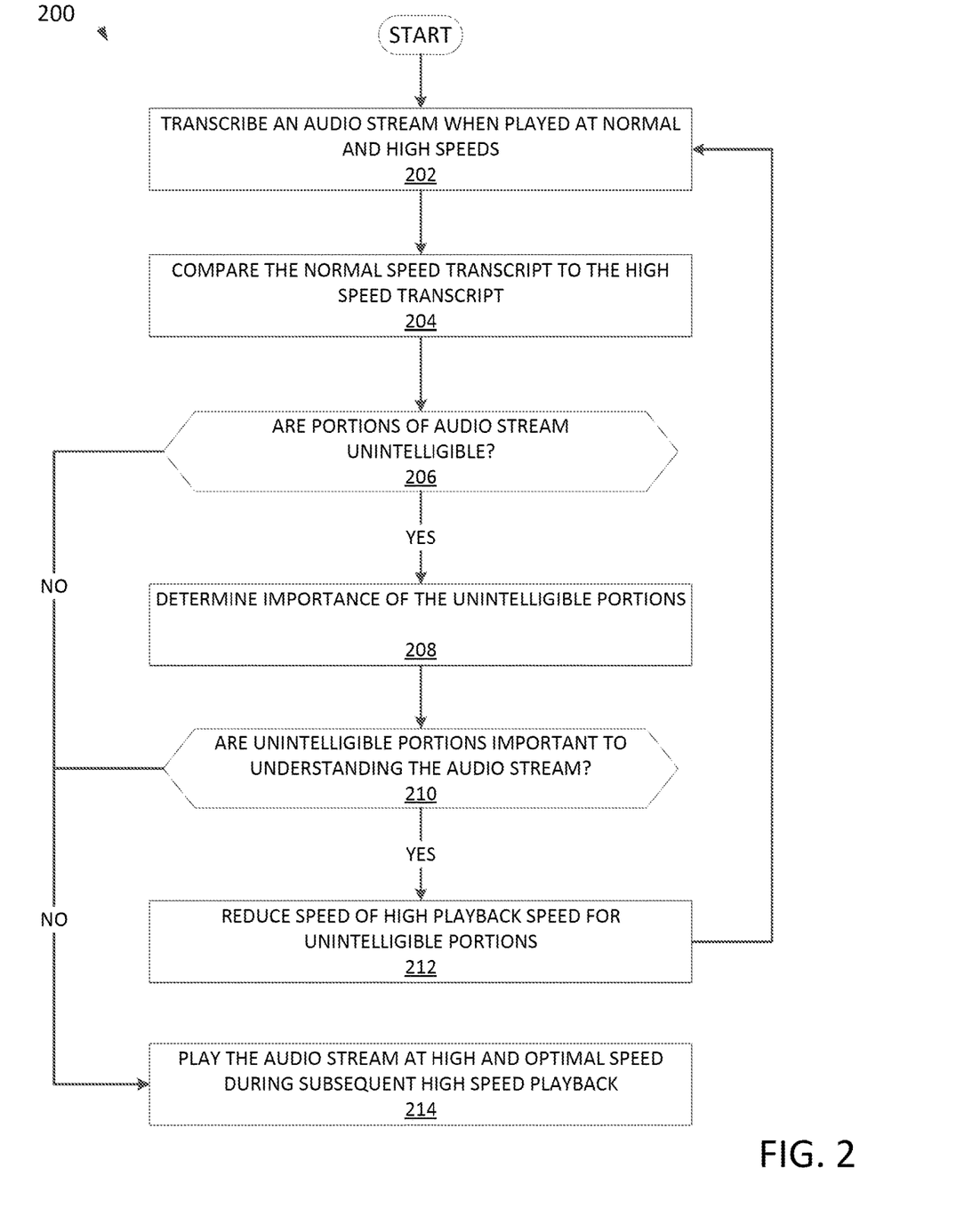
FIG. 2 depicts an exemplary flowchart 200 illustrating operations of playback optimizer 150 of computing environment 100, in accordance with the exemplary embodiments.

FIG. 2 depicts an exemplary flowchart 200 illustrating the operations of playback optimizer 150 of computing environment 100, in accordance with the exemplary embodiments. Generally, playback optimizer 150 may identify words that are unintelligible when played by listeners or readers at increased playback speeds. For example, listeners may prefer to listen to a podcast at 1.5× or 2× playback speed.

Playback optimizer 150 may transcribe an audio stream when played at both normal and high speeds (step 202). In embodiments, the audio stream may be any audio having spoken language capable of transcription to text, such as audiobooks, lectures, podcasts, and the like. Playback optimizer 150 may transcribe the audio stream via the use of speech to text (STT) methods that identify the words within the audio stream. For example, playback optimizer 150 may utilize a Hidden Markov Model for acoustic speech recognition. Playback optimizer 150 may perform playback and transcription for the audio stream at both normal playback speed (i.e., the speed at which the audio stream was recorded, 1x) and one or more increased, higher playback speeds (e.g., 1.5×, 2×, 3×). The specific higher playback speed may be selected by an administrator or assigned based on a type of audio stream, domain, etc. For example, more dense listening such as an educational material may be optimized for 1.5× playback while easy listening such as a podcast may be optimized at 2× playback. Playback optimizer 150 may transcribe the normal playback speed and the high playback speed audio streams sequentially, or may copy the audio stream into multiple instances for simultaneous playback and transcription. Playback optimizer 150 may be uploaded with the audio streams by a user, administrator, etc., and/or may be configured to scan databases or libraries for uploaded and not-yet optimized audio streams.

To better illustrate the operations of playback optimizer 150, reference is now made to an illustrative example wherein playback optimizer 150 identifies a lecture uploaded to a database. In response, playback optimizer 150 is configured to play and transcribe the lecture at 1× normal playback speed and 2× high playback speed.

Playback optimizer 150 may compare the transcripts of the normal playback speed to the high playback speed (step 204). In embodiments optimizing audio playback (as opposed to, e.g., captions), playback optimizer 150 may compare each word of the normal playback speed transcript to each corresponding word of the high playback speed transcript to ensure they are identical or substantially similar. Identical transcripts are an indication to playback optimizer 150 that the increased speed of the high playback speed had no effect on an understanding of the audio stream or portions thereof for a listener. On the other hand, differing transcripts may indicate to playback optimizer 150 that the increased playback speed results in portions of the audio stream that are potentially unintelligible to a listener. Playback optimizer 150 may compare the transcripts word by word for all or a portion of the audio stream, such as a sentence, paragraph, time duration, etc. In other embodiments, playback optimizer 150 may perform the comparison using similarity/distance measuring techniques on all or the portion of the audio stream. In embodiments utilizing distance metrics, playback optimizer 150 may first encode the categorical features of the transcripts to numerical features and vectors. Playback optimizer 150 may then apply a distance/similarity metric between the vectors, for example cosine similarity, returning a similarity score.

For embodiments that optimize text such as captions and subtitles, playback optimizer 150 may additionally compare the transcripts while considering the speeds at which the text is displayed. Playback optimizer 150 may reference predetermined captions/subtitles associated with the audio stream or generate them based on the transcription. Playback optimizer 150 may determine the rate at which the captions/subtitles are displayed on a screen (e.g., scrolled, flashed, etc.) for the normal playback speed based on the associated or generated captions/subtitles and inversely multiply that rate in accordance with the increased playback speed. For example, display time for a caption or subtitle may be inversely proportional to playback speed, meaning that doubling a speed of an audio stream may result in textual subtitles and captions displaying for half as long as normal. To account for this, playback optimizer 150 may associate the words of the transcription with the displaying times thereof to correlate at what point audio stream text is displayed as a caption or subtitle and for how long. Thus, playback optimizer 150 determines the display time for which each word in the transcript is displayed based on the transcription and playback speed. As will be described forthcoming, unlike audio playback where playback optimizer 150 determines intelligibility based on a comparison of the transcripts, playback optimizer 150 may determine intelligibility of a caption or subtitle text based on comparing an average time needed to read the text to the display time thereof, i.e., whether the caption/subtitle display time is sufficient for understanding by a reader.

Furthering the illustrative example introduced above, playback optimizer 150 compares transcribed text of the 1× speed transcript to that of the 2× speed transcript to determine a similarity score. Playback optimizer 150 may further map the displaying of captions and subtitles to corresponding points within the audio stream to deduce a time duration for which each text is displayed.

Playback optimizer 150 may determine whether portions of the audio stream are unintelligible (decision 206). When optimizing audio streams, playback optimizer 150 may identify unintelligibility based on a mismatch between words of the normal playback speed transcript and those of the high playback speed transcript. This test operates on the assumption that if the increased playback speed results in pronunciation of a word or clause that is difficult to ascertain by a listener, differing transcripts will bear them out. In embodiments, playback optimizer 150 may determine whether there is a mismatch based on comparing the similarity score determined above to a similarity threshold, where similarity scores falling below the similarity threshold are identified as mismatching. In embodiments, playback optimizer 150 may configure the similarity threshold at 100% similarity such that any mismatch in transcripts is identified as a mismatch. In other embodiments, the similarity threshold may allow for additional tolerance, and be configured such that few mismatches may be ignored (e.g., 90% similarity).

In embodiments optimizing audio converted to text such as captions or subtitles, playback optimizer 150 may perform an intelligibility test that determines whether the duration for which a text is displayed is sufficient for a reader to consume. Playback optimizer 150 may, for example, first determine the display time for which each word or clause is displayed as a caption or subtitle based on the mapping discussed above. Playback optimizer 150 may then compare the display duration to the required time needed by the specific user or a generalized user to read the word(s). The metric used for comparing reading times may be based on, for example, words per minute, characters, words, syllables, etc. If the time needed for consuming the text exceeds the display duration, playback optimizer 150 may determine that the captioning or subtitles are unintelligible. Playback optimizer 150 may note the captions/subtitles that are intelligible while omitting the unintelligible captions/subtitles along with the transcripts for later comparison.

In the aforementioned example and with respect to optimizing audio playback, playback optimizer 150 compares the similarity score between the high and low speed transcripts to a similarity threshold, where a similarity above the similarity threshold indicates that words of the 2× playback speed stream are intelligible while a similarity score below the similarity threshold indicates that words of the 2× playback speed stream are unintelligible. In addition, and with respect to optimizing caption/subtitle playback, playback optimizer 150 may compare a display duration of words within the transcript to times needed to consume those words based on an average reading speed, noting the captions/subtitles considered intelligible.

If playback optimizer 150 fails to identify portions of the audio stream that are unintelligible (decision 206, "NO" branch), then playback optimizer 150 may play the audio stream at high playback speed (step 214). Because playback optimizer 150 fails to detect any mismatched words between the transcripts and/or determines that the times needed to read captions/subtitles exceed the corresponding display durations, playback optimizer 150 determines that the audio stream is intelligibility at the higher playback speed (e.g., 1.5×, 2×, 2.5×, 3×). Accordingly, playback optimizer 150 may continue to play the entirety of the audio stream at high playback speed for listeners and readers.

Thus, in the formerly introduced example, if playback optimizer 150 determines that the similarity score is above the similarity threshold or that there is sufficient time to read captions/subtitles, playback optimizer 150 plays the entirety of the lecture at 2× speed.

Alternatively, if playback optimizer 150 identifies portions of the audio stream that are unintelligible (decision 206, "YES" branch), then playback optimizer 150 may determine an importance of the unintelligible portions (step 208). Here, playback optimizer 150 determines that either the transcripts of the audio mismatch or a reader doesn't have sufficient time to consume displayed captions/subtitles. With mismatched transcripts, differing words may result in a change a meaning of a statement while, on the other hand, insufficient time to read a caption/subtitle may result in missing information. In either case, playback optimizer 150 may determine an importance of the unintelligible portions by running the normal playback speed transcript, the high playback speed transcript, and the intelligible portions of the captions/subtitles (i.e., portions of captions/subtitles determined to have enough time for understanding) through a language analysis, for example sentiment analysis, configured to output an overall meaning of the input. In embodiments, playback optimizer 150 may determine a meaning of the transcripts (including the noted intelligible captioning/subtitling) based on applying the language analysis to an entirety of the audio stream or portions thereof, such as words, sentences, or clauses. Playback optimizer 150 may then compare the determined overall meanings of the normal playback speed transcript to that of the high playback speed transcript and/or that of the intelligible captioning/subtitling to compute an overall similarity score. The overall similarity scores may be indicative of a difference in overall meaning between the normal playback speed transcript and the high playback speed transcript, as well as a difference in overall meaning between the normal playback speed transcript and the intelligible captioning/subtitling. Playback optimizer 150 may then determine an importance of the unintelligible portions by comparing the overall similarity scores to an overall similarity threshold. In embodiments, the overall similarity threshold may be pre-set by a user or taken from a rolling average set by a crowdsourced community. The rolling average playback speeds may be based on how the listening or reading speeds are trending by the community at large. If desired, the rolling average playback speeds may be applied to playback of the user and be applied to an entirety of a media stream, particular words, clauses, topics, etc.

Continuing the previously-introduced example, playback optimizer 150 computes an overall similarity score between the meaning of the 1× playback speed transcript and that of the 2× playback speed transcript. In addition, playback optimizer 150 computes an overall similarity score between the meaning of the 1× playback speed transcript and the intelligible captioning. Playback optimizer 150 may then compare the overall similarity scores to an overall similarity threshold to indicate an importance of the unintelligible portions of the audio stream in audio and captioning/subtitling form.

If playback optimizer 150 determines that the unintelligible portions are unimportant to understanding of the audio stream (decision 210, "NO" branch), then playback optimizer 150 may play the audio stream at high playback speed (step 214). Because playback optimizer 150 determines that unintelligible portions were of little significance to understanding an overall meaning of the audio stream, playback optimizer 150 finds the audio stream intelligible at the higher playback speed (e.g., 1.5×, 2×, 2.5×, 3×). Thus, when requested, playback optimizer 150 will play an entirety of the audio stream at the high playback speed.

In the example above, if playback optimizer 150 computes an overall similarity score that exceeds the overall similarity threshold (i.e., unintelligible portions are unimportant), then playback optimizer 150 plays the lecture at 2× speed without intelligibility concerns when requested by the listener or reader.

Alternatively, if playback optimizer 150 determines that the importance of the unintelligible portions exceeds a threshold (decision 210, "YES" branch), then playback optimizer 150 may slightly reduce a playback speed of the high playback speed for the unintelligible portions of the audio stream (step 212). Playback optimizer 150 temporarily reduces a speed of the unintelligible portions in order to increase the chances of a listener or reader understanding the high playback speed. In listening-based embodiments, playback optimizer 150 may reduce a playback speed of the audio stream by a playback speed percentage (e.g., 10%), and may do so repeatedly until identifying a playback speed at which all important portions of the audio stream are intelligible, denoted as the optimal playback speed.

In text-based embodiments, such as those involving captions/subtitles, playback optimizer 150 may improve intelligibility by increasing a duration for which the captions/subtitles are displayed. In embodiments, this operation may involve simply slowing a text scroll rate or increasing a display duration for unintelligible portions. In order to maintain a same overall duration of the audio stream, increasing a display duration for one caption/subtitle may further involve reducing the display duration for neighbouring captions/subtitles. Playback optimizer 150 may, for example, increase the display duration of an unintelligible portion of captioning/subtitling by two seconds at the expense of a second or two from neighbouring captions/subtitles that are determined to still have sufficient display durations thereafter. Similarly, playback optimizer 150 may rearrange words of the captions/subtitles by moving leading or trailing words/clauses to neighbouring captions/subtitles if it results in reader consumption time sufficient to understand the unintelligible portions. If desired, playback optimizer 150 may be configured to further emphasize the important and unintelligible portions of a caption/subtitle by, for example, changes to font, size, color, etc. Playback optimizer 150 may be further configured to pause an audio stream as needed to provide sufficient time for a reader to consume the text. For example, playback optimizer 150 may pause an audio stream and display for longer a caption/subtitle that cannot be consumed within the original display time.

Returning to the previously introduced example, if playback optimizer 150 computes an overall similarity score that falls below the overall similarity threshold (i.e., unintelligible portions are important), playback optimizer 150 slightly reduces a speed of the high playback speed by 10% and/or modifies the captioning/subtitling such that a display time of the unintelligible text is increased.

As illustrated by FIG. 2, playback optimizer 150 may then repeat the processes of transcription (step 202), comparison thereof (step 204), and identifying unintelligibility (decision 206). In this iteration, however, the high playback speed audio stream or captioning/subtitling is slightly reduced/modified (see step 212). If, now at a slightly reduced high playback speed, playback optimizer 150 determines that the unintelligible portions of the audio stream remain unintelligible (decision 206, "YES" branch), and that the portions are important (decision 210, "YES" branch), then playback optimizer 150 may again reduce a playback speed of the already slightly reduced high playback speed (step 212). In such embodiments, playback optimizer 150 may continue through as many iterations reducing playback speed of the high playback speed (e.g., an additional 10%) until finding the optimal playback speed where the high playback speed audio stream is intelligible (decision 206, "NO" branch) or the unintelligible portions are unimportant (decision 210, "NO" branch). Playback optimizer 150 may then, subsequently, play the formerly-unintelligible portions of the high speed audio stream at the determined optimal speed, thereby rendering them intelligible while maintaining high playback speed elsewhere (step 214). In some embodiments, this process may reduce a speed of the unintelligible and important words back down to a normal 1× speed, and in further embodiments, playback optimizer 150 may be configured to continue reducing the high playback speed to below original playback speed of 1×, e.g., 0.5×, as needed until the optimal playback speed is identified (i.e., no unintelligibility). Thus, playback optimizer 150 may reduce a speed of unintelligible portions to a rate slower than originally recorded.

Concluding the aforementioned example, if playback optimizer 150 determines that the high playback speed audio stream is intelligible, or unintelligible portions thereof are unimportant, after slightly reducing the high playback speed, then playback optimizer 150 identifies the slightly reduced high playback speed as the optimal speed for the unintelligible portions. Subsequently, requests to play the audio stream at high playback speed will adopt the optimal speed for the unintelligible portions.

Figure 3:
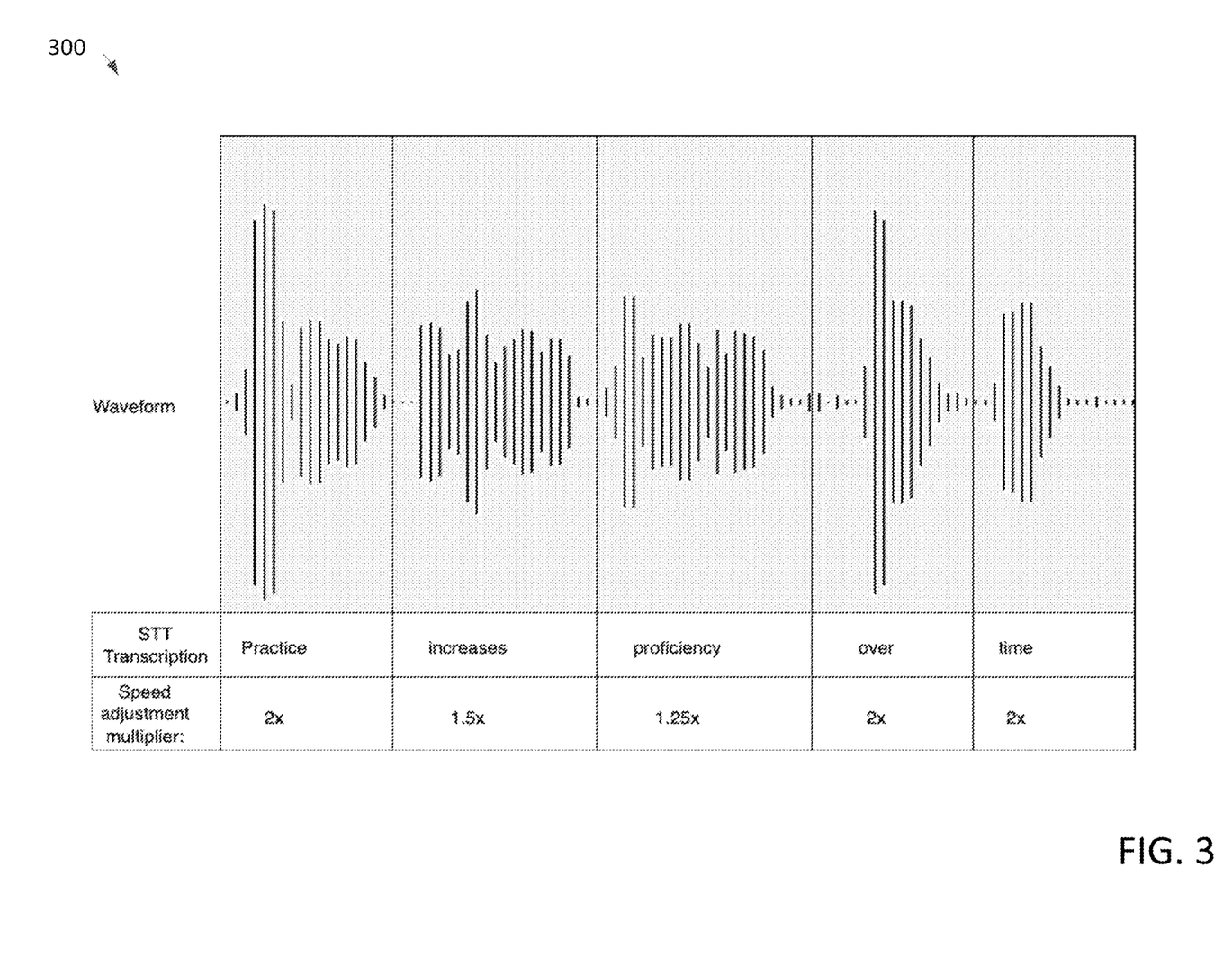
FIG. 3 depicts a sample sentence and corresponding waveform, in accordance with the exemplary embodiments.

FIG. 3 depicts a sample sentence and corresponding waveform, in accordance with the exemplary embodiments. In particular, FIG. 3 illustrates how playback optimizer 150 may modify the sentence practice increases proficiency over time for 2× playback speed. Here, playback optimizer 150 identifies the words increases and proficiency as being unintelligible and important at 2× speed. Thus, playback optimizer 150 reduces a playback speed of the audio playback at words increases and proficiency by 0.25× to 1.75×. After determining that the words increases and proficiency are still unintelligible at 1.75×, playback optimizer 150 further reduces playback speed of those words another 0.25× to 1.5×, which renders increases intelligible while proficiency requires yet another reduction to 1.25× in order to find the optimal playback speed. Having identified optimal playback speeds, subsequent playbacks requested at high playback speed will invoke playback optimizer 150 to play the audio stream at 2× speed with the exception of the portions reciting increases and proficiency, which are reduced to 1.75× and 1.5×, respectively.

What is claimed is:

1. A method for playback optimization, the method comprising:

transcribing an audio stream while played at normal playback speed, wherein the normal playback speed is that at which the audio stream was recorded;
transcribing the audio stream while played at high playback speed;
determining whether portions of the audio stream are unintelligible at the high playback speed based on comparing the transcripts;
in response to determining that the portions of the audio stream are unintelligible at the high playback speed, reducing a speed of the high playback speed for the unintelligible portions;
transcribing the audio stream with the unintelligible portions played at the reduced high playback speed;
determining whether the unintelligible portions are still unintelligible at the reduced high playback speed based on comparing the transcripts;
based on determining that the unintelligible portions are intelligible at the reduced high playback speed, identifying the reduced high playback speed as an optimal playback speed of the unintelligible portions; and
in response to receiving a request to play the audio stream at the high playback speed, playing the unintelligible portions at the optimal playback speed.

2. The method of claim 1, further comprising:
determining whether the unintelligible portions are important to an understanding of the audio stream; and
wherein reducing the playback speed of the high playback speed is further based on determining that the unintelligible portions are important to the understanding of the audio stream.

3. The method of claim 2, wherein the determining whether the unintelligible portions are important to the understanding of the audio stream further comprises:
applying a semantic analysis to the normal playback speed transcript and the high playback speed transcript; and
determining whether a semantic difference between the normal playback speed transcript and the high playback speed transcript exceeds a threshold.

4. The method of claim 1, wherein the playing the unintelligible portions at the optimal playback speed further comprises:
playing a remainder of the audio stream aside from the unintelligible portions at the high playback speed.

5. The method of claim 1, wherein the unintelligible portions are text comprising at least one of captioning and subtitling.

6. The method of claim 5, wherein determining whether the portions of the audio stream are unintelligible further comprises:
determining a display time for which the text corresponding to the audio stream are displayed;
determining whether the display time exceeds an average read time of the text; and
wherein reducing the speed of the high playback speed for the unintelligible portions is further based on determining that the display time fails to exceed the average read time, and further comprises increasing the display time of the text.

7. The method of claim 1, wherein the optimal playback speed is slower than the normal playback speed.

8. A computer program product for playback optimization, the computer program product comprising:
one or more non-transitory computer-readable storage media and program instructions stored on the one or more non-transitory computer-readable storage media capable of performing a method, the method comprising:
transcribing an audio stream while played at normal playback speed, wherein the normal playback speed is that at which the audio stream was recorded;
transcribing the audio stream while played at high playback speed;
determining whether portions of the audio stream are unintelligible at the high playback speed based on comparing the transcripts;
in response to determining that the portions of the audio stream are unintelligible at the high playback speed, reducing a speed of the high playback speed for the unintelligible portions;
transcribing the audio stream with the unintelligible portions played at the reduced high playback speed;
determining whether the unintelligible portions are still unintelligible at the reduced high playback speed based on comparing the transcripts;
based on determining that the unintelligible portions are intelligible at the reduced high playback speed, identifying the reduced high playback speed as an optimal playback speed of the unintelligible portions; and
in response to receiving a request to play the audio stream at the high playback speed, playing the unintelligible portions at the optimal playback speed.

9. The computer program product of claim 8, further comprising:
determining whether the unintelligible portions are important to an understanding of the audio stream; and
wherein reducing the playback speed of the high playback speed is further based on determining that the unintelligible portions are important to the understanding of the audio stream.

10. The computer program product of claim 9, wherein the determining whether the unintelligible portions are important to the understanding of the audio stream further comprises:
applying a semantic analysis to the normal playback speed transcript and the high playback speed transcript; and
determining whether a semantic difference between the normal playback speed transcript and the high playback speed transcript exceeds a threshold.

11. The computer program product of claim 8, wherein the playing the unintelligible portions at the optimal playback speed further comprises:
playing a remainder of the audio stream aside from the unintelligible portions at the high playback speed.

12. The computer program product of claim 8, wherein the unintelligible portions are text comprising at least one of captioning and subtitling.

13. The computer program product of claim 12, wherein determining whether the portions of the audio stream are unintelligible further comprises:
determining a display time for which the text corresponding to the audio stream are displayed;
determining whether the display time exceeds an average read time of the text; and
wherein reducing the speed of the high playback speed for the unintelligible portions is further based on determining that the display time fails to exceed the average read time, and further comprises increasing the display time of the text.

14. The computer program product of claim 8, wherein the optimal playback speed is slower than the normal playback speed.

15. A computer system for playback optimization, the system comprising:
- one or more computer processors, one or more computer-readable storage media, and program instructions stored on the one or more of the computer-readable storage media for execution by at least one of the one or more processors capable of performing a method, the method comprising:
  - transcribing an audio stream while played at normal playback speed, wherein the normal playback speed is that at which the audio stream was recorded;
  - transcribing the audio stream while played at high playback speed;
  - determining whether portions of the audio stream are unintelligible at the high playback speed based on comparing the transcripts;
  - in response to determining that the portions of the audio stream are unintelligible at the high playback speed, reducing a speed of the high playback speed for the unintelligible portions;
  - transcribing the audio stream with the unintelligible portions played at the reduced high playback speed;
  - determining whether the unintelligible portions are still unintelligible at the reduced high playback speed based on comparing the transcripts;
  - based on determining that the unintelligible portions are intelligible at the reduced high playback speed, identifying the reduced high playback speed as an optimal playback speed of the unintelligible portions; and
  - in response to receiving a request to play the audio stream at the high playback speed, playing the unintelligible portions at the optimal playback speed.

16. The computer system of claim 15, further comprising:
- determining whether the unintelligible portions are important to an understanding of the audio stream; and
- wherein reducing the playback speed of the high playback speed is further based on determining that the unintelligible portions are important to the understanding of the audio stream.

17. The computer system of claim 16, wherein the determining whether the unintelligible portions are important to the understanding of the audio stream further comprises:
- applying a semantic analysis to the normal playback speed transcript and the high playback speed transcript; and
- determining whether a semantic difference between the normal playback speed transcript and the high playback speed transcript exceeds a threshold.

18. The computer system of claim 15, wherein the playing the unintelligible portions at the optimal playback speed further comprises:
- playing a remainder of the audio stream aside from the unintelligible portions at the high playback speed.

19. The computer system of claim 15, wherein the unintelligible portions are text comprising at least one of captioning and subtitling.

20. The computer system of claim 19, wherein determining whether the portions of the audio stream are unintelligible further comprises:
- determining a display time for which the text corresponding to the audio stream are displayed;
- determining whether the display time exceeds an average read time of the text; and
- wherein reducing the speed of the high playback speed for the unintelligible portions is further based on determining that the display time fails to exceed the average read time, and further comprises increasing the display time of the text.

\* \* \* \* \*